(12) United States Patent
Flaks et al.

(10) Patent No.: US 8,424,105 B2
(45) Date of Patent: *Apr. 16, 2013

(54) INTEGRATING SECURITY BY OBSCURITY WITH ACCESS CONTROL LISTS

(75) Inventors: Jason Scott Flaks, Redmond, WA (US); Jordan L. K. Schwartz, Seattle, WA (US); Michael I. Torres, Seattle, WA (US); Joseph Andrew Bono, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 18 days.

This patent is subject to a terminal disclaimer.

(21) Appl. No.: 13/158,273

(22) Filed: Jun. 10, 2011

(65) Prior Publication Data

US 2011/0247083 A1    Oct. 6, 2011

Related U.S. Application Data

(63) Continuation of application No. 11/762,885, filed on Jun. 14, 2007, now Pat. No. 7,984,512.

(51) Int. Cl.
*G06F 7/04*    (2006.01)
*H04N 7/167*    (2011.01)

(52) U.S. Cl.
USPC ............... 726/28; 726/2; 726/10; 705/57

(58) Field of Classification Search ......... 726/28
See application file for complete search history.

(56) References Cited

U.S. PATENT DOCUMENTS

| | | |
|---|---|---|
| 6,279,111 B1 | 8/2001 | Jensenworth et al. |
| 6,457,130 B2 | 9/2002 | Hitz et al. |
| 6,560,631 B1 | 5/2003 | Ishihara et al. |
| 6,934,753 B2 | 8/2005 | Kim |
| 6,978,381 B1 | 12/2005 | Te et al. |
| 6,981,217 B1 | 12/2005 | Knauft et al. |
| 7,007,025 B1 | 2/2006 | Nason et al. |
| 7,085,736 B2 | 8/2006 | Keezer et al. |

(Continued)

FOREIGN PATENT DOCUMENTS

GB    WO0145341 A3    6/2001

OTHER PUBLICATIONS

International Search Report and Written Opinion Received for PCT Application No. PCT/US2008/064956, mailed on Nov. 18, 2008, 11 pages.

(Continued)

*Primary Examiner* — Matthew Smithers
(74) *Attorney, Agent, or Firm* — L. Alan Collins; Collins & Collins Intellectual, LLC

(57) ABSTRACT

Aspects of the subject matter described herein relate to providing and restricting access to content. In aspects, information (e.g., a URL) that identifies content and a user is provided to a user. In conjunction with providing the information to a user, a data structure (e.g., an access control list) is updated to indicate that the user has access to the content. The user may use the information to access the content and/or may send this information to other users. The other users may use the information (e.g., by pasting it into a browser) to access the content and may be added to the data structure so that they may subsequently access the content without the use of the information. Access to the content via using the information may be subsequently revoked.

15 Claims, 7 Drawing Sheets

U.S. PATENT DOCUMENTS

| | | | |
|---|---|---|---|
| 7,136,945 | B2 | 11/2006 | Gibbs et al. |
| 7,237,268 | B2 | 6/2007 | Fields |
| 7,323,999 | B2 | 1/2008 | Heidloff et al. |
| 7,363,035 | B2 | 4/2008 | Reilly |
| 7,373,173 | B2 | 5/2008 | Brittan et al. |
| 7,490,133 | B1 | 2/2009 | Leban et al. |
| 7,567,987 | B2 | 7/2009 | Shappell et al. |
| 7,574,746 | B2 | 8/2009 | Hill |
| 7,904,557 | B1 * | 3/2011 | Van Riel et al. ............... 709/225 |
| 7,984,512 | B2 * | 7/2011 | Flaks et al. ....................... 726/28 |
| 2004/0010710 | A1 | 1/2004 | Hsu et al. |
| 2004/0068521 | A1 | 4/2004 | Haacke et al. |
| 2005/0251675 | A1 | 11/2005 | Marcjan et al. |
| 2006/0021031 | A1 | 1/2006 | Leahy et al. |
| 2006/0095779 | A9 | 5/2006 | Bhat et al. |
| 2006/0106802 | A1 | 5/2006 | Giblin |
| 2006/0122936 | A1 | 6/2006 | Balfanz |
| 2006/0235897 | A1 | 10/2006 | O'Hara |
| 2008/0177743 | A1 | 7/2008 | Kasatani |

OTHER PUBLICATIONS

Oorschot, "Message Authentication by Integrity With Public Corroboration", ACM Press, 2005, pp. 57-63.

Duraiswamy et al., "Security through Obscurity", retrieved at <<http://www.infosecwriters.com/text_resources/pdf/security_through_obscurity.pdf>>, pp. 1-7, Jun. 20, 2004.

Beale, "Security Through Obscurity Ain't What They Think It Is", available as early as Apr. 5, 2007, retrieved at <<http://www.bastille-linux.org/jay/obscurity-revisited.html>>, 2000, pp. 1-4.

EP Communication for Application No. 08756353.2-2212 / 2156402 PCT/US2008064956, Reference FB22334, Aug. 20, 2012.

* cited by examiner

FIG. 4

| ACL for Album 1 ||
|---|---|
| UserID 405 | Access 410 |
| Mike | Allowed |
| John | Allowed |
| Jordan | Allowed via John |
| Mary | Allowed via John |
| Group1 | Allowed |
| Group2 | Allowed |

400

INTEGRATING SECURITY BY OBSCURITY WITH ACCESS CONTROL LISTS

RELATED APPLICATION(S)

This Application is a continuation of, and claims priority from, U.S. patent application Ser. No. 11/762,885 that was filed on Jun. 14, 2007 and that is incorporated herein by reference in its entirety.

BACKGROUND

When sharing photos, computer users may upload their photos to a server and then send a uniform resource locator (URL) to friends they want to see the photos. Anyone who has received the URL can click on it or put it into the address field of a web browser to view the photos.

While this method allows people to share photos, it has several shortcomings. For example, this method may become unwieldy when a user tries to re-view different albums that have been shared as the user may need to search through various e-mails to obtain the URLs. Furthermore, people may forward the URL to others or may post the URL on a web site. This may allow more people to see the photos than the person originally sending the URL anticipated.

SUMMARY

Briefly, aspects of the subject matter described herein relate to providing and restricting access to content. In aspects, information (e.g., a URL) that identifies content and a user identity is provided to a user. In conjunction with providing the information to a user, a data structure (e.g., an access control list) is updated to indicate that the user has access to the content. The user may use the information to access the content and/or may send this information to other users. The other users may use the information (e.g., by clicking on a link, pasting it into a browser, etc.) to access the content and may be added to the data structure so that they may subsequently access the content without the use of the original information. Access to the content may be subsequently revoked.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 4 is an exemplary data structure that indicates the users that have access to an album in accordance with aspects of the subject matter described herein.

DETAILED DESCRIPTION

Exemplary Operating Environment

Figure 1:
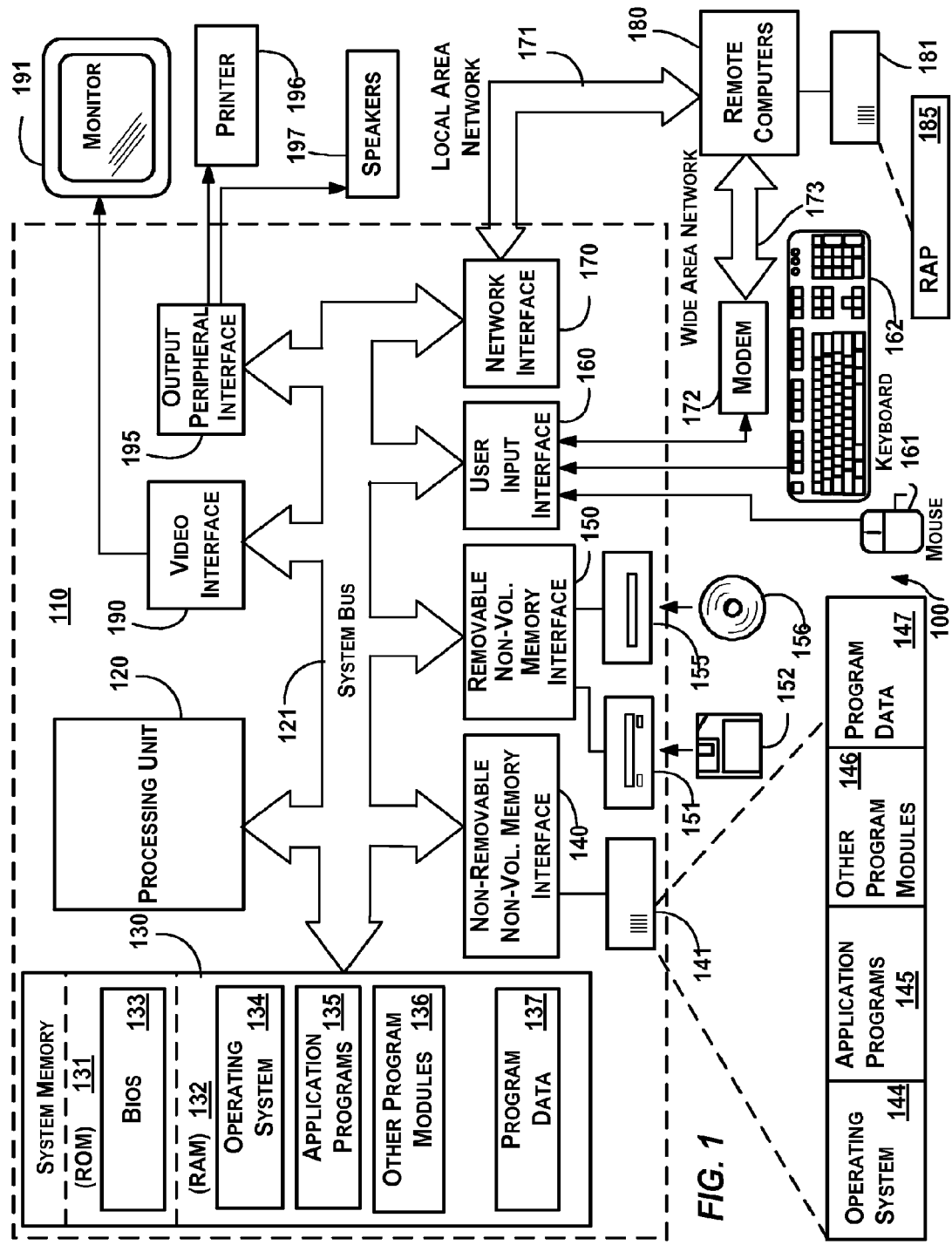
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. The term "computer storage media" as used herein refers to a statutory article of manufacture that is not a signal or carrier wave per se.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Security Integration

As mentioned previously, obscure URLs provide a convenient mechanism to share photos. An obscure URL is a URL that depends on the URL not being generally known or easily guessable to restrict access to the photos. Being able to integrate URLs and access control lists (ACLs), however, provides an even more flexible way to share photos.

Although aspects of the subject matter described herein are described in conjunction with photos, in other embodiments, other data may be shared by mechanisms described herein. In one embodiment, any content including text, hyperlinks, multi-media content, a file or set of files, any other data structure or structures, and the like may be placed on a server and accessed via the mechanisms and techniques described herein. Thus, while in some embodiments, the content that may be shared via aspects of the subject matter described herein comprises photo images and albums placed on a server, in other embodiments, aspects described herein apply to files or other data structures placed on a server. Furthermore, unless explicitly indicated otherwise, in some embodiments, the terms "photo" and "album" as well as when used as part of a word (e.g., albumID, photos, albums) may be replaced with "content" wherever they are found in the detailed description. In other embodiments, the terms "photo" and "album" have the definition described in the next paragraph.

As used herein, in some embodiment, an album is a collection of one or more images. The images do not need to be taken by a camera and may be scanned or created images. As used herein, in some embodiments, a photo includes an image that may be stored on a computer-readable medium and also does not need to be taken by a camera.

Furthermore, although the term server is often used herein, it will be recognized that this term may also encompass a client, a peer, a set of one or more processes distributed on one or more computers, one or more stand-alone storage devices, a set of one or more other devices, a combination of one or more of the above, and the like that is capable of providing access to photos and/or albums.

Figure 2:
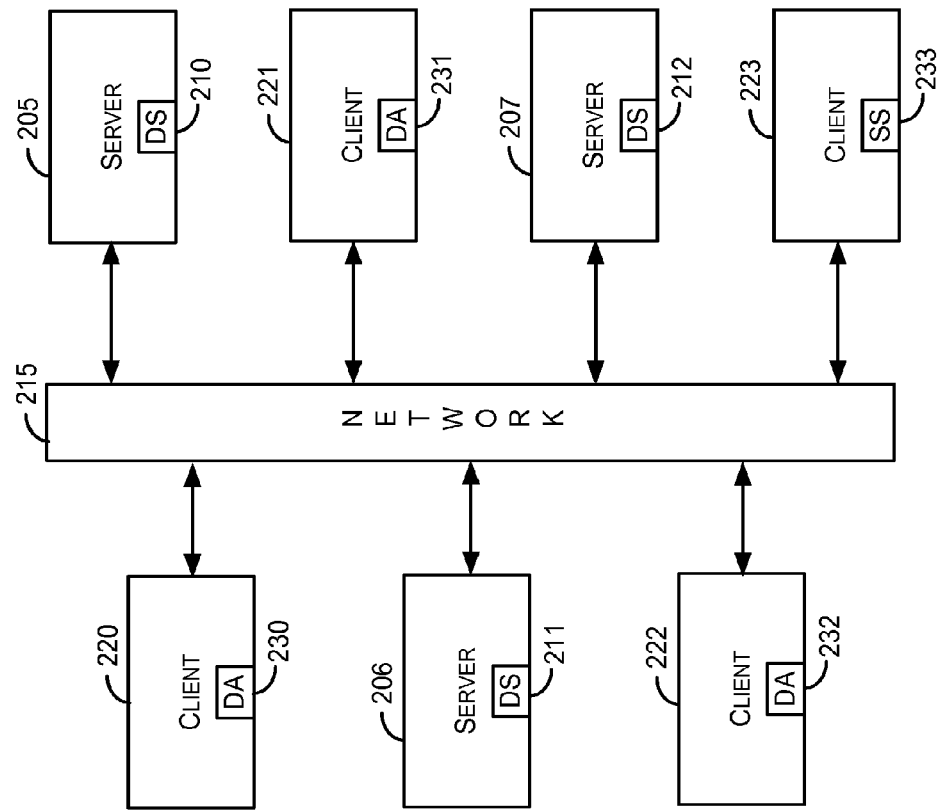
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes servers 205-207 and clients 220-223 and may include other components (not shown). The various entities may communicate with each other via various networks including intra- and inter-office networks and the network 215. In one embodiment, the network 215 may comprise the Internet.

Each of the servers 205-207 and the clients 220-223 may be implemented on one or more computers (e.g., computer 110 as described in conjunction with FIG. 1). The servers 205-207 may include data sharing components 210-213, respectively, that provide photos to authorized clients such as the clients 220-223. In one embodiment, the servers 205-207 may replicate photos for scalability and redundancy, for example. In another embodiment, the servers 205-207 may each host a certain subset of photos. Clients may be referred to or configured to access the server that hosts the desired photos.

The clients may include data accessing components 230-233, respectively, that allow the clients 220-223 to access the photos on the servers 205-207. In one embodiment, a data accessing component may comprise a web browser. In another embodiment, a data accessing component may comprise an application, one or more processes, components, or the like that communicate with one or more servers to obtain photos thereon.

Although the environment described above includes three servers and four clients, it will be recognized that more, fewer, or a different combination of these entities may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
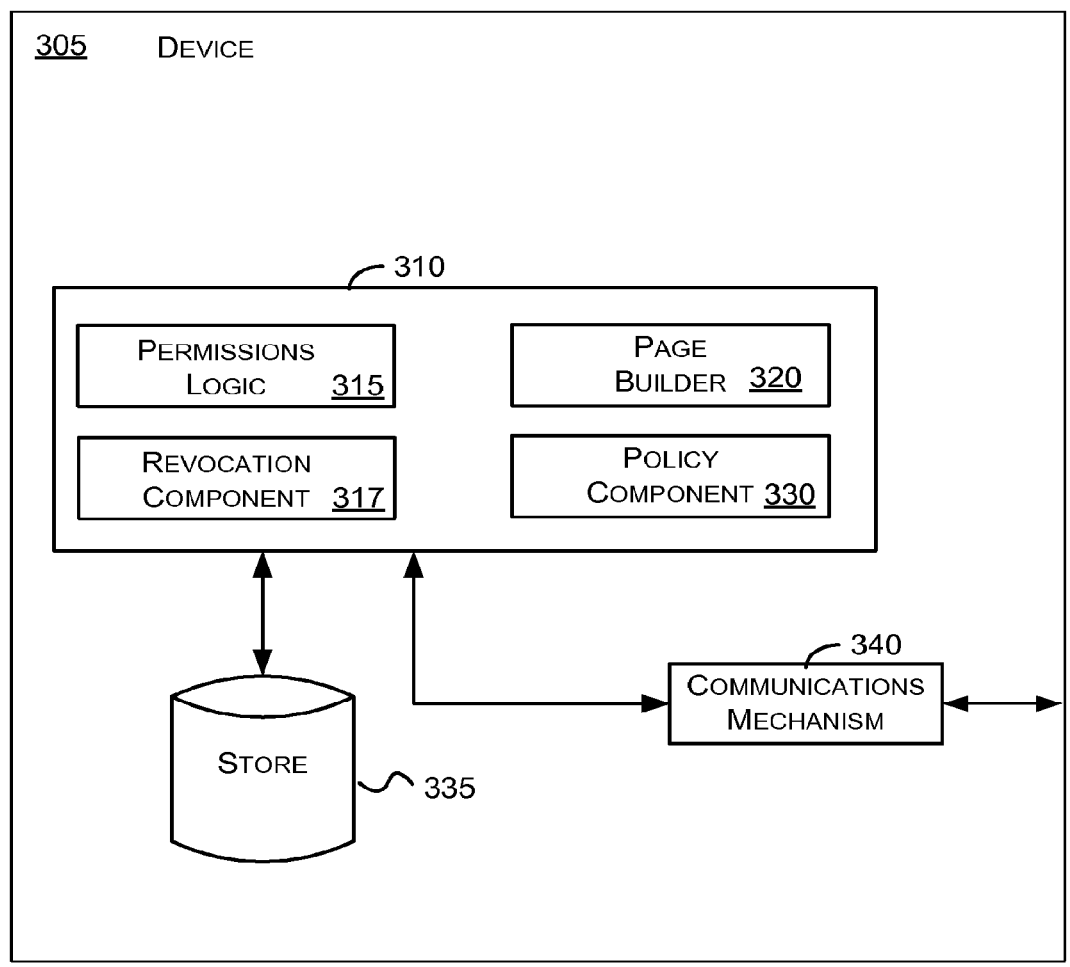
FIG. 3 is a block diagram that represents an exemplary device configured to operate in accordance with aspects of the subject matter described herein.

FIG. 3 is a block diagram that represents an exemplary device configured to operate in accordance with aspects of the subject matter described herein. The device 305 may include a data sharing component 310, a store 335 and a communications mechanism 340. The data sharing component 310 may include permissions logic 315, a revocation component 317, page builder 320, and a policy component 330. The device 305 may correspond to one of the servers 205-207 of FIG. 2. The data sharing component 310 corresponds to the data sharing components 210-212 of FIG. 2.

The communications mechanism 340 allows the device 305 to communicate with other devices to provide information that allows access to albums as well as receive requests for the albums. The communications mechanism 340 may be a network interface or adapter 170, modem 172, or any other mechanism for establishing communications as described in conjunction with FIG. 1.

The store 335 is any storage media capable of storing content including albums and images. The store 335 may also store access control lists. The store 335 may comprise a file system, database, volatile memory such as RAM, other storage, some combination of the above, and the like and may be distributed across multiple devices. The store 335 may be external or internal to the device 305. In one embodiment, the access control lists and the content may be stored on two or more separate stores similar to the store 335. In another embodiment, the access control lists and the content may be stored on a single store similar to the store 335.

In operation, the device 305 may receive a request to view photos in an album from a client (such as one of the clients 220-223). The request may come from a client having a logged-on user or a client having a non logged-on user. In one embodiment, a logged-on user is a user that has identified himself or herself and provided credentials (e.g., a user name and password) to authenticate the user.

In other embodiments, the term identified as used above may indicate that a client has provided information that places the user in an authorized class of users without actually identifying the specific user. This might be done, for example, by providing an IP address of the client. A service on the device 305 or elsewhere may match this IP address to the authorized class of users and grant access accordingly. It will be recognized that many other authentication schemes may be used that identify or do not identify the particular user without departing from the spirit or scope of aspects of the subject matter described herein.

When a user logs onto the device 305, the permissions logic 315 may be used to determine what albums the user should be given access to. To make this determination, the permissions logic 315 may use an access control list (ACL). An ACL may indicate a list of users and may also indicate the access rights that each of the users has in the photos. In one embodiment, access rights only include the ability to read a photo. In another embodiment, access rights may include read, write, delete, modify, create, and the like. Each album and/or photo may be associated with an ACL.

An ACL associated with an album may be changed at various times. For example, when an album is first created, the owner of the album may indicate users that are to have access to the photos of the album. Any time thereafter, the owner may update the ACL associated with the album to add or delete users that may access the photos of the album. The owner may also update what access rights are granted to each user listed in the ACL. As discussed in more detail below, an ACL may be updated when an owner sends an e-mail to a user that invites the user to access the photos of the album.

In one embodiment, each image of an album may also be associated with an ACL. If an image is associated with an ACL, the ACL of the image controls when determining whether to grant access to the image. An owner of the image may change the ACL of the image similarly to how the owner would change the ACL of the album containing the image.

In one embodiment, changing the ACL of an album automatically changes the ACLs of all images in the album to match that given to the album. In another embodiment, changing the ACL of the album does not automatically change the ACLs of all the images in the album. This behavior may be controlled via a check box or other control in a user interface, for example.

The access right granted when an owner causes an e-mail to be sent to a user (or any other time) may be revoked later by the owner without deleting or moving the album or photos. Such rights may be revoked by the revocation component 317 which may modify the access rights in the store 335 based on a revocation request received by the data sharing component 310.

As mentioned previously, in some embodiments, a user identity may not be included in a URL sent to another user. Furthermore, the same URL may be sent to one or more other users. Any user that provides the URL is granted access to the content (unless access based on the URL has been revoked). Rights granted by the URL may be revoked thus disabling access to anyone subsequently using the URL, provided that the user does not also have other rights to the content. To grant rights to a new set of users, access based on the URL may be revoked and a new URL to the content may be sent.

After the permissions logic 315 has been used to determine what albums the user should be given access to, these albums (or thumbnails, icons, links, or other references thereto) may be displayed by the page builder 320. The page builder 320 may also display other text, links, multi-media material, and the like and may display photos of the album at various places on a displayed page. In addition, the page builder 320 may display the actions a user can take on an album.

With a logged-on user, the permissions logic 315 may use an ACL associated with an album to determine what access rights, if any, a user should be given to a particular album. If the user should not be given access to a particular album, the album may not be displayed and may not be shown in any index or link displayed to the user. Note that a logged-on user, even one that has clicked on a URL associated with a particular album, may also be able to view other albums for which the user has been given access rights.

A non logged-on user may also be able to obtain access to an album. This may be done by requesting content associated with a URL. The URL may have been given earlier to the user vie an e-mail, for example. For example, an owner of an album may desire to have a group of friends be able to see photos within the album. To make this possible, the owner may send (or cause to be sent to) the friends an e-mail including a link which, when selected, provides access to the photos.

In one embodiment, the link may take the form of http://domain_name/path_name/VALUE, where VALUE is created by encrypting an albumID and/or userID with a secret key. When a server receives the VALUE, it may decrypt the albumID and/or the userID. After obtaining the albumID, the server may access an ACL associated with the albumID. If the ACL grants access rights to a user having the decrypted userID, the server may then grant access to the photos within the album.

In another embodiment, other data such as sender ID and time stamp may also be encrypted in the link. In another embodiment, the link may take the form of http://domain_name/path_name/VALUE, where VALUE is a GUID. The GUID may be associated with (or actually be) an albumID and/or userID. When the link is received, the GUID may be used to look up (or may actually be used as) the albumID and/or userID which may then be used as indicated above.

When sending links to friends, the owner of the photo may utilize a user interface that includes contacts, groups of friends, e-mail addresses, and so forth. In conjunction with sending the link, the user interface may instruct the server to add the users, e-mail addresses, and groups included in the links to ACLs associated with the albums identified in the links. By adding users and groups included in the links to the ACLs, these users and groups can also access the photos without using the link. For example, a user or member of a group may log onto a server that includes the photos. The server may examine albums to which the user or member has been given access and may display links to these albums.

Note that by allowing a group to be associated with an ACL, users may be granted or denied access without changing the ACL itself. For example, if a member of the group is deleted, the member no longer has the rights indicated by the ACL associated with the group. If a new member is added to the group, this member may then be granted rights indicated by the ACL associated with the group.

Users who are registered (e.g., have a user account) with a server, may also access the photos via the link without logging on to the server. They may simply click on the link which causes their browser to send the VALUE to the server. Using this VALUE, the server may give them access to the appropriate album.

In giving access to an album to a user that is not logged-on, the server may ask a user whether the user desires to log-on or register with the server. A user that already has an account on the server may enter a user name and password or provide some other credentials. Once this is done, the page builder 320 may display the album, add the user to the ACL associated with the album so that the user can access the album later without using the URL previously sent, and also allow the user to access other albums the user has access to.

A user that does not already have an account on the server (e.g., a user that is not registered) may create an account on the server, if desired. If the user decides not to create an account, the user may still be shown the album provided that the access rights associated with the userID of the VALUE have not been revoked. As the user continues to use this account, the user may be able to access albums that the user has previously been granted access to via links, provided the user has indicated that he or she should be added to the ACLs associated with the albums.

After the user has created an account, the data sharing component 310 may update an ACL to indicate that the user has access to the photos. The data sharing component 310 may also provide an indication of how the user obtained the access rights. For example, the data sharing component 310 may indicate that the user obtained the rights to view the album via the user identified in the link.

This has an interesting result. A user may forward the link to other users, who may forward the link to other users, and so forth. A user may post the link on a web site and allow other users to obtain the link. As long as the access rights associated with the userID of the link have not been revoked, any user using the link may access the photos identified by the link.

In another embodiment, if the link does not include a userID, a user who receives the link may forward it to others, post it on a web site, or otherwise give it to other users. These other users may be given access rights to the album identified by the link unless and until the access rights associated with the link (not userID) are revoked.

In another embodiment, access rights may be granted to only the first set number of users that actually access the album using the link. The number of users that can access the album using the link may be configurable through a user interface, for example.

A server may track the number of times a particular link is used to access an album (e.g., through a column of the data structure 400 of FIG. 4). While this information does not necessarily identify who has accessed the album, it may provide an indication of how widely a link has been further distributed. For example, an album that has been accessed thousands of time by a particular link may indicate that the link has been shared with many others. The number of times each link has been used to access an album may be available to an owner of the album. The owner may use this information to guess that a link has been accessed by a large number of people other than the person the link was originally forwarded to. If the owner wishes to revoke access rights to the link, the owner may do so. Subsequent uses of the link after that time will not be allowed to access the album.

An owner may send a link to others and indicate that the link does not allow the others to forward the link to yet others. In this case, the link may encode the albumID or a reference to the album but not the userID. When a server receives a request associated with the link, the server may determine whether the user sending the request is also logged-on to the computer. If not, the server may determine that the user is not allowed to view the album (unless the album is for viewing by anyone). If a user is logged onto the server, the server may then look up the ACL associated with the album to determine whether the user should be given access to the album.

If the user forwards this link to another user, the same process as indicated above is followed. Unless the user independently has access rights to the photos, the user is not granted access to the photos simply by clicking on the URL. This process allows those who have access rights according to the ACL to access the album, but not those that do not have access rights according to the ACL. Thus, an owner of the album may use this mechanism to ensure that only users to whom the owner has sent the link may access the album. Of course, if a user has given the user's credentials to others, these others may also be able to access the album, but it is anticipated that normally most users will not give their credentials to others and that if they do, the access tracking mechanism above may be used to guess that this has happened—at least in a case where the user has broadly distributed his or her credentials to others.

It is anticipated that there are at least four different scenarios in which a user may attempt to access an album associated with a link. In a first case, a user who is logged on to the server uses the link to access the album. In the first case, the user who is logged on is also the user who is identified by the link. In a second case, a user who is logged on uses the link to access the album, but the user who is logged on is not the same as the user identified by the link. In the third and fourth cases, a user who is not logged on to the server uses the link to access the album. In these cases, the user may rely on the credentials included in the link to access the album and may not log-on to the server. In these cases, the user may or may not be the same as the user identified in the link. The user may or may not have an account on the server.

In the first and second cases, the server may use the most permissive access rights to determine whether to grant the user access to the album. For example, if the user has rights to access the album, but the rights of the link have been revoked, the user is given access to the album. Note that in the first case, the user identified in the link and the user logged on are the same. In this case, if the rights of the link have been revoked, this may also revoke the rights of the user so the user may no longer have access to the photos with or without the link.

In the second case, if the link grants rights to access the album, but the user has not been granted those rights via an ACL, the user may be given rights to access the album. The user may also be asked whether the user wishes to be added to the ACL associated with the album for subsequent accesses of the album.

In the third and forth cases, rights to access the album may be determined solely by the rights granted by the link. If the user subsequently logs-on or registers with the server, the user may be given an opportunity to indicate whether the user should be added to an ACL associated with the album for subsequent accesses of the album.

The policy component 330 may determine which identity to present to other components. For example, if a logged-on user having a first userID has used a URL encoded with a second userID to request access to an album, the policy component 330 may provide the first userID for any ACL modifications and provide the first and second userIDs to the permissions logic 315 to determine the albums that the user should be given access to.

FIG. 4 is an exemplary data structure that indicates the users that have access to an album in accordance with aspects of the subject matter described herein. The data structure 405 includes two columns: userID 405 and access 410. In each row of the data structure are two fields corresponding to these columns. Each row may include a user ID and a access allowed to the user associated with the user ID.

In one embodiment, it may simply be enough to have a single column: userID 405. In this embodiment, if a user is listed in the userID field, the user is allowed read access to the album. If a user is not listed in a userID field, the user is not allowed access to the album.

In other embodiments, however, the access column 410 may include what type of access rights each user has (e.g., read, write, create, and so forth). In addition, an access field (or another field in the data structure 400) may indicate how the user gained the access the user has (e.g., via another user). For example, if Jordan and Mary use a link sent to John to gain access to the album, Jordan and Mary's access entry in the data structure 400 may indicate that they gained access rights to the album through John.

In an embodiment, a user that has been given access to an album via a URL (or otherwise) may send a different URL to other users to give them access to the URL. If these other users indicate that they wish to be added to the ACL for the album, an indication of the user that gave them access may also be stored in the ACL. For example, if Jordan was allowed access via a URL sent by John and then Jordan created a new URL and sent it to Mary, an indication that Mary was allowed access by Jordan may be stored in the ACL.

In one embodiment, the userID column 405 may include ID's of groups of one or more users. Any user in the group of one or more users has the access indicated in the group's associated access field.

It will be recognized that many types of data structures may be used to accomplish the purpose of the data structure 400. For example, a data structure may have as one of its columns the album ID. In this data structure, access for multiple albums may be included in one data structure. Other examples of suitable data structures will be apparent based on the teachings herein to those of ordinary skill in the art. Such data structure may be used without departing from the spirit or scope of aspects of the subject matter described herein.

Figure 5:
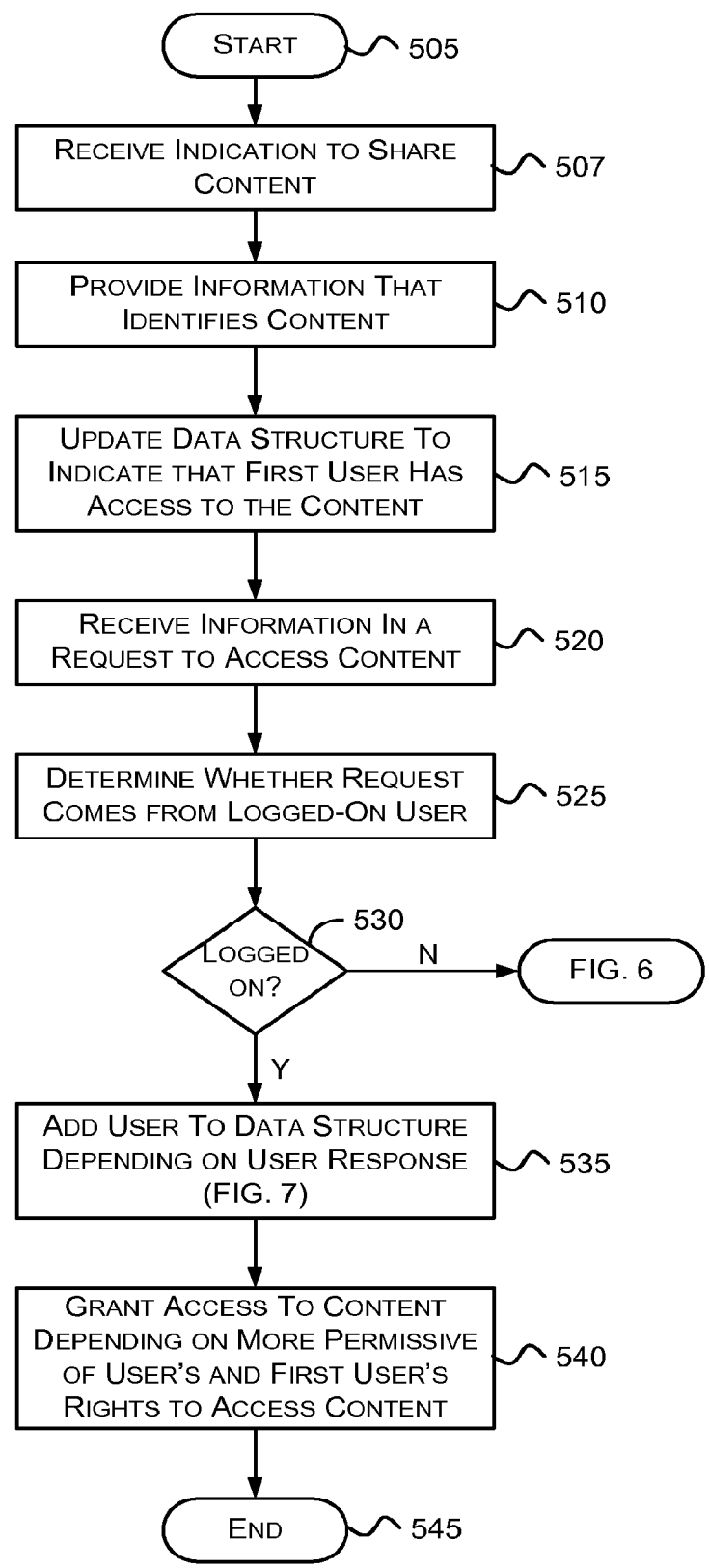
FIGS. 5-7 are flow diagrams that generally represent exemplary actions that may occur in accordance with aspects of the subject matter described herein.
Figure 6:
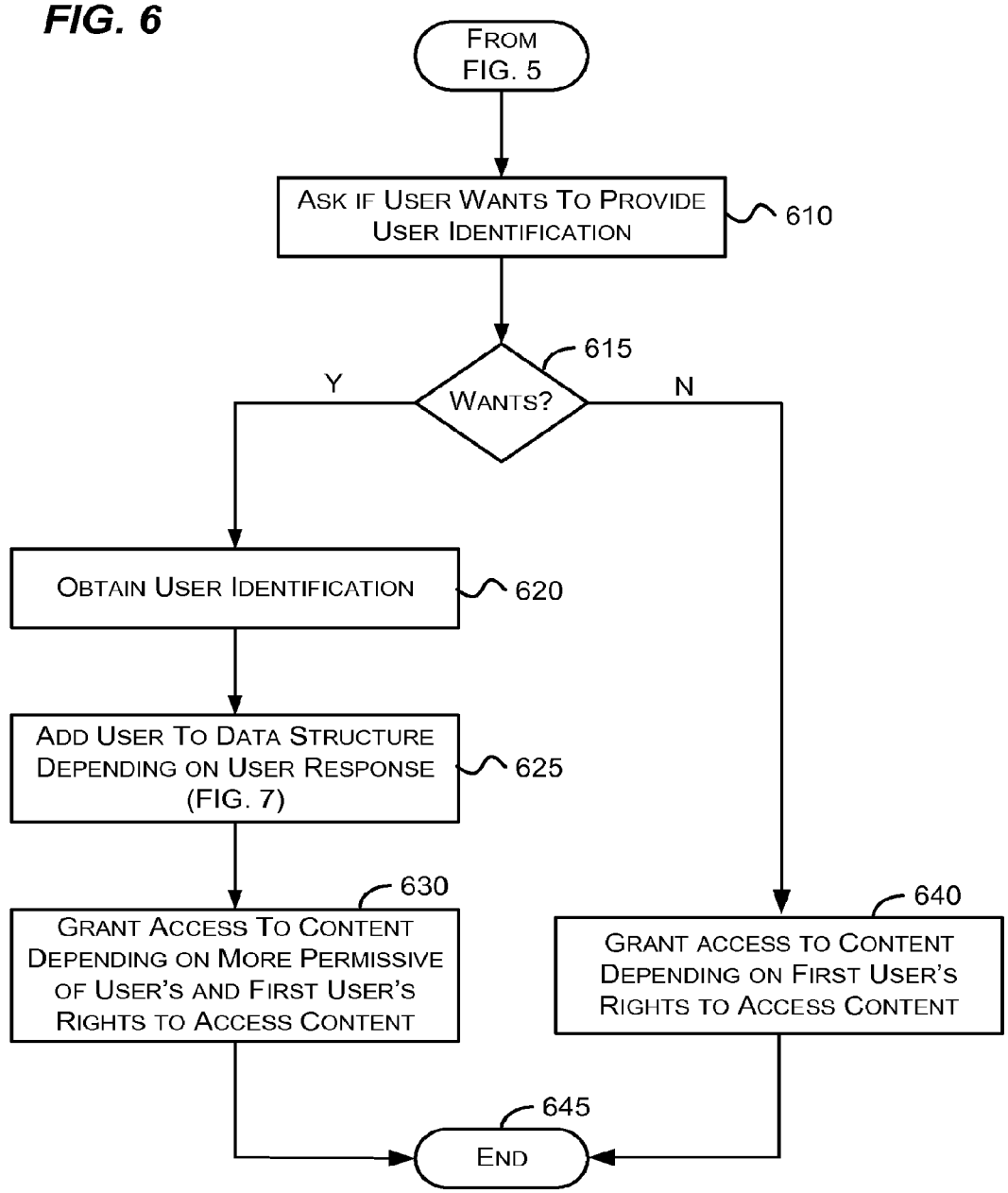
Figure 7:
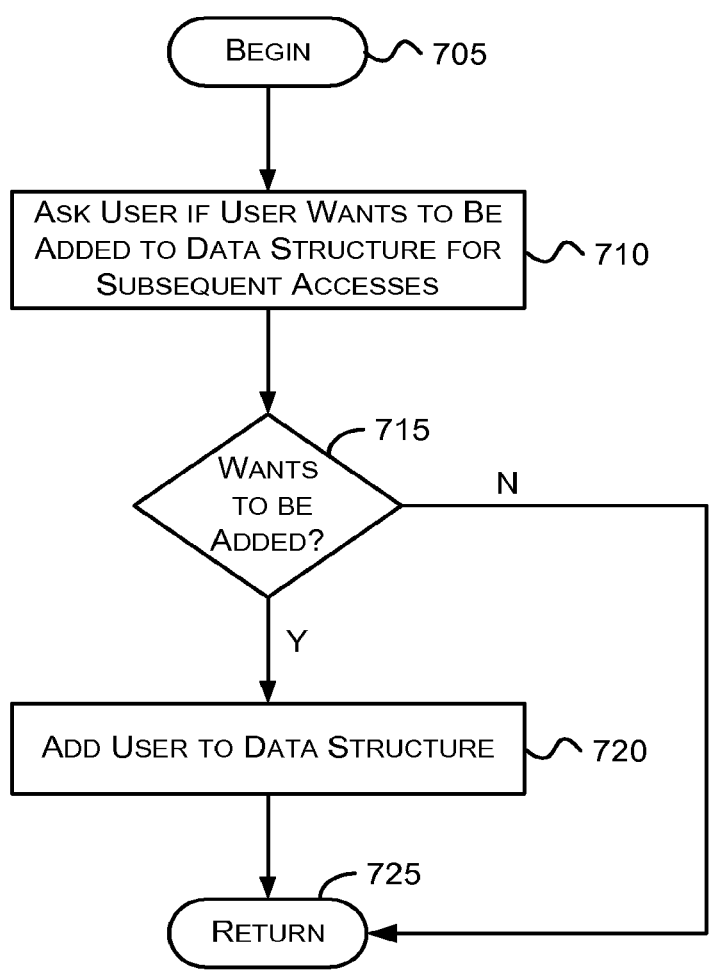

FIGS. 5-7 are flow diagrams that generally represent exemplary actions that may occur in accordance with aspects of the subject matter described herein. For simplicity of explanation, the methods described in conjunction with FIGS. 5-7 are depicted and described as a series of acts. It is to be understood and appreciated that the aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methods in accordance with aspects of the subject matter described herein. In addition, those skilled in the art will understand and appreciate that the methods could alternatively be represented as a series of interrelated states via a state diagram or as events.

Turning to FIG. 5, at block 505, the actions begin. At block 507, an indication that a user desires to share content with a set of one or more other users is received. For example, a user may open a user interface and select from a list of users and/or groups of users that the user wants to be able to view the content.

At block 510, information that identifies the content is provided. For example, referring to FIG. 2, the data sharing component 211 may provide a link to an album to a user associated with the client 220 via an e-mail that includes the link. As described previously, the link may encode the albumID of an album and the userID of the user. This information may be encrypted as described previously.

At block 515, a data structure is updated to indicate that the user has access to the content. For example, referring to FIG. 4, the data structure 400 may be updated with a row that indicates that the user identified by the userID John is allowed to access the album having the identifier of 1. Note that in some embodiments, the actions associated with block 515 may occur before or in parallel with the actions associated with block 510.

At block 520, a request to access content is received. For example, referring to FIG. 3, the communications mechanism 340 may receive a request from a user for an album. The request may include a userID and albumID, for example.

At block 525, a determination is made as to whether the request comes from a logged-on user. As was mentioned previously, a user may or may not be logged-on to a server that includes the album. In one embodiment, this may be determined by obtaining a cookie or other data structure from the client.

At block 530, if the request comes from a logged-on user, the action continue at block 535; otherwise, the actions continue at block 610 of FIG. 6.

At block 535, the user is added to the data structure depending on the user's desire to have this happen as is described in more detail in FIG. 7.

At block 540, access to the content is granted depending on the more permissive of the user's and the first user's rights to access the content. As described previously, the user may have rights to access the content independently of the link. If this is the case and the rights granted in the link have been revoked, the user may still be able to access the contents. If the user does not have rights to access the contents apart from the link, the link grants these rights unless it has been revoked.

At block 545, the actions end.

Turning to FIG. 6, at block 610, the user is asked if the user wants to provide user identification. The user may want to access the content anonymously or by giving the user's identification to make subsequent access easier as has been described previously.

At block 615, if the user wants to provide identification, the actions continue at block 620; otherwise, the actions continue at block 640.

At block 620, the user's identification is obtained. For example, referring to FIG. 3, the device 305 may obtain user credentials via the communications mechanism 340.

At block 625, the user is added to the data structure depending on the user's response as described in more detail in conjunction with FIG. 7. For example, the user may have an account on the system. If so, the user may want to logon to the account so that the user may view the content later without needing the link. If the user does not have an account, the user may want to register for an account so that the user does not need to keep links to view the content the user has been given access to.

At block 630, the user is granted access to the content depending on the more permissive the user's and the first user's rights similar to the actions that occur at block 540 of FIG. 5.

At block 640, the user is granted access to the content depending on the first user's rights to access the content. As long as the first user's rights have not been revoked, the link will allow the user to access the content with the first user's right.

At block 645, the actions end.

Turning to FIG. 7, the actions begin at block 705. At block 610, the user is asked whether the user wants to be added to the data structure for subsequent accesses for reasons that have been described earlier.

The user wants to be added, then at block 715, the actions continue at block 720; otherwise, the actions continue at block 725.

At block 720, the user is added to the data structure and optionally through which use the user was added may also be indicated in the data structure. For example, referring to FIG. 4, Jordan may be added to the data structure 400 with an indication that Jordan was added via John's access.

At block 725, the actions return.

Although, some of the embodiments above have described sending a URL to others as a means for allowing the others to view content, in other embodiments, this may be done in other ways. For example, an encrypted or partially encrypted packet of information (sometimes called a "ticket") may be sent via a TCP, UDP, HTTP, a peer-to-peer protocol, or some other protocol. This may be done, for example, via e-mail, while two users are engaged in a chat session on-line, during a game or other interaction, and the like. The ticket may identify anything that a URL may including content and/or user identity. A user who receives a ticket may use it to access the content associated with the ticket. It will be recognized by those skilled in the art that many other mechanisms for sharing ticket may also be used without departing from the spirit or scope of aspects of the subject matter described herein.

Furthermore, although there has been some mention of URLs being used to identify a location of content, in other embodiments, a uniform resource identifier (URI), an identifier of a location in a file system, an index into a database, a globally unique identifier (GUID), or any other mechanism for identifying the location of content may be used. In other embodiments, each reference to a URL in this document should be replaced with a reference to one or more of these other mechanisms for identifying the location of content.

As can be seen from the foregoing detailed description, aspects have been described related to accessing content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method of granting access to content, the method comprising:

granting, by a computer in response to determining that a second user desires to access the content anonymously and based on an identifier of a first user provided by the second user, the second user access to the content according to rights of the first user; and granting, by the computer in response to determining that the second user desires to access the content based on the identifier, access to the content according to rights that are most permissive of rights of the second user and the rights of the user, wherein the determinings are based on a ticket provided by the second user that includes the identifier of the user in an encrypted form.

2. The method of claim 1, further comprising determining that the second user is not logged on to a server of the content.

3. The method of claim 1, wherein the ticket includes an identifier of the content in an encrypted form.

4. The method of claim 1, wherein the ticket was previously shared by the first user with the second user.

5. The method of claim 4 wherein, the shared ticket was previously shared via email.

6. At least one computer storage media storing computer-executable instructions that, when executed by a computer, cause the computer to perform a method of granting access to content, the method comprising:

granting, by a computer in response to determining that a second user desires to access the content anonymously and based on an identifier of a first user provided by the second user, the second user access to the content according to rights of the first user; and granting, by the computer in response to determining that the second user desires to access the content based on the identifier, access to the content according to rights that are most permissive of rights of the second user and the rights of the user, wherein the determinings are based on a ticket provided by the second user that includes the identifier of the user in an encrypted form.

7. The at least one computer storage media of claim 6, the method further comprising determining that the second user is not logged on to a server of the content.

8. The at least one computer storage media of claim 6, wherein the ticket includes an identifier of the content in an encrypted form.

9. The at least one computer storage media of claim 6, wherein the ticket was previously shared by the first user with the second user.

10. The at least one computer storage media of claim 9, wherein the shared ticket was previously shared via email.

11. A system comprising a computer configured for granting, in response to determining that a second user desires to access the content anonymously and based on an identifier of a first user provided by the second user, the second user access to the content according to rights of the first user, and for granting, in response to determining that the second user desires to access the content based on the identifier, access to the content according to rights that are most permissive of rights of the second user and the rights of the user, wherein the determinings are based on a ticket provided by the second user that includes the identifier of the user in an encrypted form.

12. The system of claim 11, the computer further configured for determining that the second user is not logged on to a server of the content.

13. The system of claim 11, wherein the ticket includes an identifier of the content in an encrypted form.

14. The system of claim 11, wherein the ticket was previously shared by the first user with the second user.

15. The system of claim 11, wherein the shared ticket was previously shared via email.

\* \* \* \* \*